United States Patent
Blumenschein et al.

(10) Patent No.: US 8,330,864 B2
(45) Date of Patent: Dec. 11, 2012

(54) MULTI-LINGUAL TRANSMISSION AND DELAY OF CLOSED CAPTION CONTENT THROUGH A DELIVERY SYSTEM

(75) Inventors: Steven G. Blumenschein, Laurel, MD (US); Joseph E. Van Riper, Germantown, MD (US)

(73) Assignee: Xorbit, Inc., Columbia, MD (US)

( * ) Notice: Subject to any disclaimer, the term of this patent is extended or adjusted under 35 U.S.C. 154(b) by 505 days.

(21) Appl. No.: 12/610,665

(22) Filed: Nov. 2, 2009

(65) Prior Publication Data
US 2010/0194979 A1    Aug. 5, 2010

Related U.S. Application Data

(60) Provisional application No. 61/110,581, filed on Nov. 2, 2008.

(51) Int. Cl.
H04N 5/445 (2006.01)
H04N 7/16 (2011.01)

(52) U.S. Cl. ............. 348/564; 375/240.26; 725/137

(58) Field of Classification Search ............. 348/465, 348/468, 564, 473; 725/137; 704/8, 277; 375/240.26
See application file for complete search history.

(56) References Cited

U.S. PATENT DOCUMENTS

| | | | |
|---|---|---|---|
| 5,543,851 A | 8/1996 | Chang | |
| 5,926,205 A | 7/1999 | Krause et al. | |
| 5,949,952 A | 9/1999 | Bennett et al. | |
| 6,233,253 B1* | 5/2001 | Settle et al. | 370/474 |
| 6,373,526 B1 | 4/2002 | Kessler et al. | |
| 7,035,804 B2 | 4/2006 | Saindon et al. | |
| 7,349,429 B2 | 3/2008 | Lee et al. | |
| 7,809,549 B1* | 10/2010 | Bangalore et al. | 704/2 |
| 2002/0112066 A1* | 8/2002 | Agraharam et al. | 709/231 |
| 2003/0035072 A1 | 2/2003 | Hagg | |
| 2003/0046075 A1* | 3/2003 | Stone | 704/257 |
| 2003/0216922 A1* | 11/2003 | Gonzales et al. | 704/260 |
| 2005/0075857 A1* | 4/2005 | Elcock et al. | 704/2 |
| 2005/0162551 A1* | 7/2005 | Baker | 348/468 |
| 2005/0188297 A1* | 8/2005 | Knight et al. | 715/500.1 |
| 2006/0136226 A1* | 6/2006 | Emam | 704/277 |
| 2007/0064095 A1* | 3/2007 | Baartman et al. | 348/14.08 |
| 2007/0106516 A1* | 5/2007 | Larson et al. | 704/270 |
| 2007/0136777 A1* | 6/2007 | Hasek et al. | 725/114 |
| 2008/0018791 A1* | 1/2008 | Ramaswamy | 348/563 |
| 2009/0178010 A1* | 7/2009 | Chaudhri | 715/863 |
| 2010/0175082 A1 | 7/2010 | Blumenschein et al. | |
| 2011/0110646 A1 | 5/2011 | Smith et al. | |

OTHER PUBLICATIONS

Abrahamian, Sarkis. "EIA-607 and EIA-708 Closed Captioning." 4 pages.
"Closed Captions and the SCC Format." http://www/geocities.com/mcpoodle43/SCC_TOOLS/DOCS/SCC_FORMAT.HTML. Accessed Oct. 17, 2008.

* cited by examiner

*Primary Examiner* — Victor Kostak
(74) *Attorney, Agent, or Firm* — Whiteford, Taylor & Preston LLP

(57) ABSTRACT

Disclosed is a system and method of blending multiple closed caption language streams into a single output for transmission using closed caption encoding devices. Closed caption signals are created by remote closed caption generating systems that are connected to an input device, such as a stenography keyboard or voice recognition system. The closed caption signals are generated at multiple remote closed caption generating systems and in different languages, and are then independently transmitted to a multiplexing system where they are properly identified and blended into a single output data stream. The single output data stream is then delivered to a closed caption encoding device via a connection such as an Ethernet or serial connection.

18 Claims, 4 Drawing Sheets

MULTI-LINGUAL TRANSMISSION AND DELAY OF CLOSED CAPTION CONTENT THROUGH A DELIVERY SYSTEM

CROSS REFERENCE TO RELATED APPLICATION

This application is based upon and claims benefit of copending U.S. Provisional Patent Application Ser. No. 61/110,581 entitled "Multi-Lingual Transmission and Delay of Closed Caption Content Through a Delivery System", filed with the U.S. Patent and Trademark Office on Nov. 2, 2008 by the inventors herein, the specification of which is incorporated herein by reference.

FIELD OF THE INVENTION

This invention relates generally to processing of closed caption data, and more particularly to systems and methods for combining multi-lingual closed caption data streams into a single output signal for transmission.

BACKGROUND

Closed captioning is a system used to display text on a television or video screen, which text typically includes a transcription of the audio portion of a program as it is being viewed. Closed captioning may thus be used by persons with hearing impairments to allow them to better enjoy and comprehend a program they are viewing.

For analog television transmission, the closed caption standard is EIA-608, and for digital television transmission, the closed caption standard is EIA-708B. In each case, closed caption data is created by transcribing the particular program's script, text, or other information, and is encoded into the video signal, which integrated signal is then transmitted to broadcasters for transmission to end users.

A shortcoming remains, however, in attempting to transmit a single program to different areas where the populations speak different languages. While closed captioning content may be encoded into a signal delivered to a particular area serving speakers of one language, it may be incomprehensible to other members of the population that do not speak such language, whether hearing impaired or not. For broadcasters, the technical challenge of simultaneously transmitting various different versions of the same program in different languages is not desirable, as it adds administrative burden and cost that outweigh the benefit that might be realized by transmitting multiple versions of the same program. Thus, there remains a need for a system and method that would allow a single video transmission to include multiple closed caption streams in different languages so that a broadcaster may meet the closed caption viewing needs of a diverse language population without incurring the unmanageable administrative burdens and costs associated with the production of multiple versions of the same program.

SUMMARY OF THE INVENTION

Disclosed is a system and method of blending multiple closed caption language streams into a single output for transmission using closed caption encoding devices. Closed caption signals are created by remote closed caption generating systems that are connected to an input device, such as a stenography keyboard or voice recognition system. The closed caption signals are generated at multiple remote closed caption generating systems and in different languages, and are then independently transmitted to a multiplexing system where they are properly identified and blended into a single output data stream. The single output data stream is then delivered to a closed caption encoding device via a connection such as an Ethernet or serial connection.

The remote closed caption generating systems are configured to delay, at a stenographer user request, the playback of audio, video, or other data sent to the remote closed caption generating system for transcription. Thus, if an original program is in one language and is translated into a second language prior to transmission to the remote closed caption generating system, the user of the remote closed caption generating system may delay portions of the transmission, such as the received translated audio portion of the transmission, so that the video being viewed by the captioner matches the translated audio stream.

Likewise, the multiplexing system is configured to allow the delay of selected data streams to adjust for timing differences caused by translation of the original transmission, such that multiple closed caption data streams for a single portion of a broadcast, that are received from multiple, independent captioners, can be blended into a single output for transmission, allowing a user to simply select which caption stream (and thus, which language) they wish to view. The translated audio (whether originating from a third party translator prior to transmission to the remote closed caption generating system, or from a translator recording translated audio into the remote closed caption generating system during the closed caption transcription process) may likewise be inserted into the audio signal for delivery to the end user, such as a television viewer. In this manner, an economical method is provided enabling the multi-lingual transmission of closed caption data to aid hearing impaired individuals of varied languages to view and fully comprehend program content, while optionally providing secondary, translated audio options for hearing viewers.

BRIEF DESCRIPTION OF THE DRAWINGS

The numerous advantages of the present invention may be better understood by those skilled in the art by reference to the accompanying figures in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed is a computer software and/or hardware-based system and method for combining multiple closed captioning data streams generated from multiple stenography sources 110 in multiple languages into a single data output stream for transmission.

Figure 1:
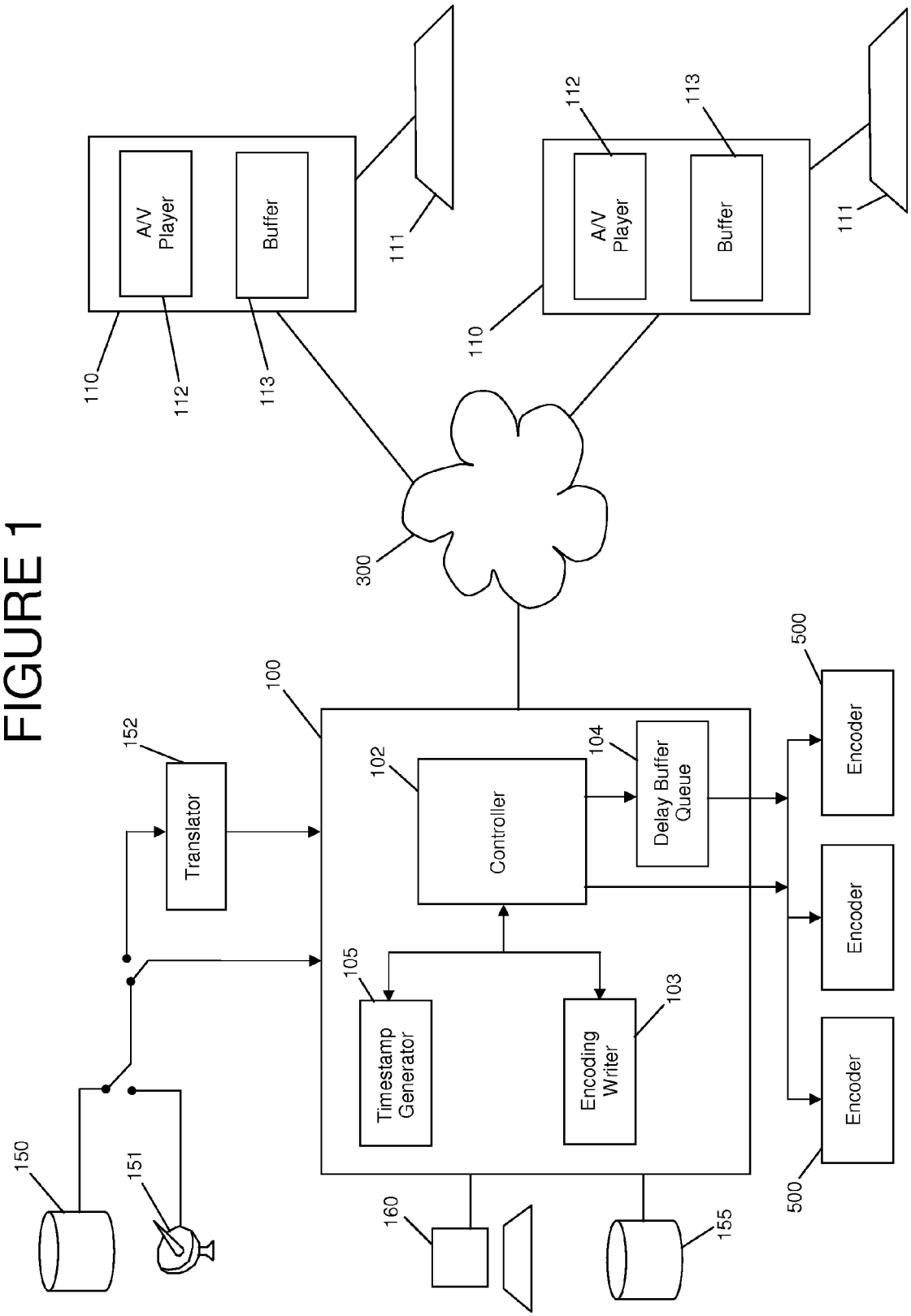
FIG. 1 is a schematic view of a multi-lingual closed caption processing system in accordance with a preferred embodiment of the invention.

As shown in the schematic view of FIG. 1, a data multiplexing system 100 is in data communication with a plurality of closed caption data generating systems 110 across preferably a wide area computer network 300, such as the Internet. One or more closed caption encoding devices 500 are preferably in data communication with the data multiplexing system 100. The wide area computer network 300 preferably provides a delivery mechanism for delivering audio, video, and/or other data, including metadata, to a stenographer user of the closed caption data generating systems 110 (preferably at least one of which generates closed captioning data in a language other than the language of the original program content), and likewise for receiving back from the closed caption data generating systems 110 the individual streams of translated closed caption data that have been generated by the remote stenography user using, for instance, a stenographer tool 111 or other closed caption data input device. The closed caption data generating systems 110 preferably include either software- or hardware-implemented Audio/Video ("A/V") display components 112 capable of receiving and displaying to the stenographer user the A/V data that is to be encoded as closed caption data. Such A/V data may, for instance, be stored in a database 150 in communication with multiplexing system 100, or alternatively may be supplied as a live transmission from a broadcaster 151, or as a live or pre-recorded transmission from another service. Optionally, voice actors 152 may translate the original data into the intended stenographer user's language, and such translated data is delivered to the stenographer user in place of the original data. The stenographer user preferably may elect to use either the original data or the translated data. In situations where the original data has not been translated prior to delivery to the stenographer user, the stenographer user will preferably use the original data and perform their own translation.

The closed caption data generating systems 110 and a server computer hosting at least multiplexing system 100 are preferably configured in a client/server application relationship communicating with one another using TCP/IP packets. In this regard, the client closed caption data generating systems establish a connection to the server application, and provide information about the client to the server application. In particular, the client informs the server of what kind of captioning data the client will send to the server, such as (by way of non-limiting example) CC1, CC2, CC3, CC4, TT1, TT2, or so on. Other tunable feeds of captioning data, whether currently existing or yet to be implemented, may likewise be used, so long as they provide a discreet transmission channel, without departing from the invention. In a typical configuration, the closed caption data generating client may send only one particular kind of captioning information.

A stenographer preferably logs into multiplexing system 100 prior to sending captioning information. An administrator to multiplexing system 100 may establish login information prior to the stenographer logging in, which log in information may be stored in an administrative database 155 in communication with multiplexing system 100. Part of this information includes the kind of captioning data a particular stenographer may send. This allows the multiplexing system 100 to determine the caption stream to which to send the closed caption data. Alternatively, if the captioning stream is not determined prior to logging in, the stenographer may choose while logging in. If neither the system administrator nor the captioner choose, the system preferably defaults to CC1 for the duration of the session.

In addition to a wide area network such as the Internet, other delivery mechanisms may likewise be used to deliver the A/V data to the closed caption generating system 110 (and to deliver closed captioning data back to the multiplexing system 110), such as a local area network, an Intranet, a private telecommunication line, a "POTS" (plain old telephone system), or other electronic data communication mechanisms. Likewise, the A/V data may be provided over the Internet as streaming video data, thus allowing either real-time or post production generation of closed caption data.

In the event that closed captioning data is to be generated in real time (i.e., for integration with the audio or video transmission at the time that it is to be broadcast to the end user), it may be preferable to delay certain data streams in the process to ensure sufficient time to both generate and integrate such closed captioning data into the transmission. Thus, selected data streams being transmitted to a foreign language stenographer user, including but not limited to audio, video, and other metadata, may be delayed to provide the proper delay so that, for instance, the video action matches the translated audio stream (the transmission of which may be delayed during the translation process). Such delays are managed by the client device by buffering the data in delay buffer queue 113 until it is to be played back to the stenographer. Preferably, the stenographer user may select the amount of delay they wish to use. The client device then buffers the incoming data (e.g., audio and/or video information) for as long as the requested delay, and then plays the information out on the client device.

The closed caption signals can be created by the closed caption data generating systems 110 using any closed caption compliant creation system 111 including a stenography device (e.g., a court reporter keyboard) or a voice recognition system, and a personal or network-enabled computing device. The stenographer creates closed caption output while viewing and/or listening to the translated audio or video using closed caption data generating system 110. The closed caption output can then be transmitted over the delivery method described above to the multiplexing system 100. Particularly, the stenography device 111 sends the captioning data to the client application of the closed caption data generating system 110, which then forwards that data through the TCP/IP connection, tagged as stenographer data, to multiplexing system 100. The client closed caption data generating system 110 is expected to send only data for a specific captioning stream. As a result, multiplexing system 100 does not expect captioning data for multiple captioning streams to be sent from one client. As such, in a typical configuration, two closed caption generating systems 110 are required to send captioning data from both CC1 and CC3 at the same time.

Closed caption output signals from disparate closed caption data generating systems 110 created in various languages travel independently to multiplexing system 100 where they are properly identified and blended into a single output data stream to send to one or more encoders 500. The multiplexing system 100 inserts captioning by writing captioning information to one or more encoders 500 (which may be connected to the system by serial, TCP/IP, or some other mechanism). A lock (known as a mutex, for "mutually exclusive") ensures that two streams of captioning cannot be inserted on top of each other. As such, when two captioners write to different streams, a first captioner preferably gains permission to write to the encoder 500, writes the captioning information, then relinquishes permission, so the next captioner may write to the encoder 500. The encoder 500 knows to which stream of captioning the caption should encode the captioning based on the encoder commands embedded by the system, and the encoded data transcoded by the system, as described below.

For each data stream (e.g., CC1, CC2, CC3, CC4, T1, T2, and any other discreet transmission channels, whether now existing or developed in the future), the multiplexing system 100 receives at controller 102 the data stream, and remembers (e.g., by consulting a listing in administrative database 155 of data stream types associated with particular closed caption data generating systems 110) that the data for the respective connection is intended to be of a particular kind of stenographic data, and will convert the data to that type if necessary (e.g., if the closed caption data actually received from a particular closed caption generating system 110 is formatted for CC1, but is supposed to be sent to the encoder as CC3, the multiplexing system 100 will transcode the CC1 data to CC3). Thus, if different from the expected data stream format, the received captioning is transcoded from its original caption stream to the stream that it is configured to send to the encoder. In this case, all encoder commands sent with the captioning data from closed caption data generating system 110 are stripped. Prior to writing the information to the encoder, encoder command writer 103 inserts commands for the encoder into the new data stream, thus reconstructing the commands for the appropriate stream (e.g., for CC1, commands specific to sending a CC1 stream will be constructed, while for CC3, commands specific to sending a CC3 stream will be constructed). To transcode the encoder commands as necessary, the incoming commands in the captioning data stream are analyzed by controller 102 to determine the kind of encoder command that was originally written, and the command is rewritten in terms of the intended captioning stream. By way of non-limiting example, the EIA-608 document (incorporated herein by reference) describes how the captioning is to be formatted for the various stream types. Such information may be found, for instance, in EIA-608 5.4 (Closed Caption Mode), 5.5 (Text Mode), 8.18 (Data Channel Nomenclature for Captions and Text), and Annex D (Closed Captioning Codes). It is noted, however, that those of ordinary skill in the art will recognize that other encoding schemes may likewise be used, including those yet to be implemented for digital video, without departing from the spirit and scope of the instant invention.

In the NTSC television format, the processing performed by controller 102 is executed in preferably two passes—one specific to translating between field 1 and field 2, and another specific to translating between data channel 1 and data channel 2. A map is maintained in administrative database 155 of preambles for a particular data channel, and when a preamble is found that belongs to the wrong data channel, it is replaced with the one for the data channel that was actually intended. The same process is likewise implemented for fields. A map is maintained in administrative database 155 of preambles for the two field types, and when a preamble is found for the wrong field, it is replaced with the one for the field that was actually intended. The correct field and data channel are determined based on the desired captioning channel.

With regard to stripping original encoder commands from the stream transmitted by a closed caption data generating system 110, it is possible to have different encoders that require different processing. As such, different codes are necessary to handle different kinds of encoders 500, in order to recognize the encoder command and strip it, and in order to insert the encoder commands again later. For most encoders (following the current EEG standard), one can simply remove all 0x03 and 0x06 bytes, and remove anything between a 0x01 byte and an ASCII return character (inclusive). However, some encoders require different processing.

It is particularly necessary to strip and then inject the encoder commands because the encoder commands help tell the encoder where the captioning data should be inserted (e.g., to which field of line 21 the data must go). In any event, while different encoders may require different processing, it is believed that identification and removal of encoder commands of any format from the closed captioning data stream is within the level of ordinary skill in the art.

The multiplexing system 100 is also told if any captioning streams need to be delayed before being sent to an encoder. If so, the controller 102 of multiplexing system 100 can delay one or more closed caption data streams to adjust for translation timing differences by tagging the caption data with time information and putting the data in a delay buffer queue 104, which in turn will send the captioning data to the encoder 500 (just as if written by the stenographer, but delayed in time). More particularly, caption delays are handled by buffering the captioning until it is time to play back the delayed captioning. This type of delay is handled by the multiplexing system 100, as instructed by administrative client 160. Incoming captions for the delay are tagged with a timestamp from a timestamp generator 105, and the delay for the individual caption is determined from this timestamp, plus the amount of time configured by the administrator through administrative client 160. The multiplexing system 100 preferably uses a separate thread for managing this delay buffer queue 104 and the delay (for each stream), although one might implement this without a separate thread. A thread monitors the delay buffer queue 104, picking up the next item waiting in the queue, waiting for the amount of time it would take to send it at its destination time, before sending the item to the encoder. It then looks for the next item to delay, for as long as the captioning session continues. This delay thread is created when needed, and then remains until the session is over, at which time the thread is told to terminate. If the thread does not detect any captioning waiting in the delay buffer queue 104, it will preferably pause for one 10th of a second before checking the queue again.

The delay is specified through a setting submitted to the multiplexing system 100 by a human administrator using administrative client 160, preferably prior to going on-air (although changes may be made while on-air, in which case they are applied to incoming captions, not previously-entered captions). The delay is assigned to a particular caption stream (e.g., CC1). All configuration-related commands are submitted to the multiplexing system 100 using administrative client 160, rather than the closed caption data generating system 110 used for the stenographer. Such settings are preferably stored locally on the administrative database 155, and applied again when the server starts.

While the delay is preferably configured by an administrator to the system prior to the event to be captioned, it may alternatively be configured during the event, although one is discouraged from changing this setting during an event (but this is helpful when initially deciding how to configure this kind of information, through experimentation).

The delay is expressed in some common unit of time (e.g., seconds), and is chosen based on need. One might elect to delay the captioning, for example, because they are viewing a pre-roll a/v feed, but the captioning is going to a live feed that is delayed by some amount of time.

If the captioning belongs to a stream that does not need to be delayed, it will be immediately written to the encoder.

After the proper encoder commands are inserted, the server will then send the captioning data to one or more encoder devices 500 (e.g., eeg's SmartEncoder, or Norpak's TES). If the captioning data is intended to be transmitted immediately, it is sent to all encoders configured by the multiplexing system, immediately. The signal may be delivered to a closed caption encoding device via a well known methodology, such as Ethernet (TCP/UDP/Token Ring/Etc.), serial connection (RS232, RS432, etc.), or the like. Such encoding device 500 then encodes the captioning. The encoder commands written by encoding command writer 103 may be encoder-specific and tailored for the chosen encoder. The encoder 500 thereafter weaves the given captioning data into the video transmission (e.g., for analog video, into line 21 of the vertical blanking interval).

The encoders 500 are protected by a mutex to ensure that the TCP/IP thread and delay thread do not attempt to send captioning data at exactly the same time (which might lead to interruptions in the captioning stream). The queue for storing the captioning is also protected by a mutex to ensure the delay thread and the TCP/IP thread do not create inconsistencies in the queue.

The captioning data may be transmitted back to closed caption generating systems 110 interested in a particular captioning stream (i.e., CC1 captioning data may be sent to stenographers configured to send CC1 data, while CC3 captioning data may be sent to stenographers configured to send CC3 data). More particularly, a server-echo may bounce the same information received by the stenographer back to the stenographer (and other stenographers configured for the same caption stream). The server-echo may be played by the closed caption generating system 110 immediately upon receiving it from the multiplexing system 100. This is useful for seeing the last captioning one sent, and possibly correcting mistakes one may have made during live captioning. Similarly, a confidence return may pull the captioning from the multiplexing system's incoming audio/video feed and send it to the stenographers configured for the same caption stream. Configured correctly, this would show the stenographer what the television viewer will actually see, because it comes directly from the audio/video source that is going to the television viewer. In those instances where confidence returns might be difficult to set up, or may involve a delay (in the case of delayed captioning), or are otherwise impractical for a given environment, a server-echo may be better suited.

Figure 2:
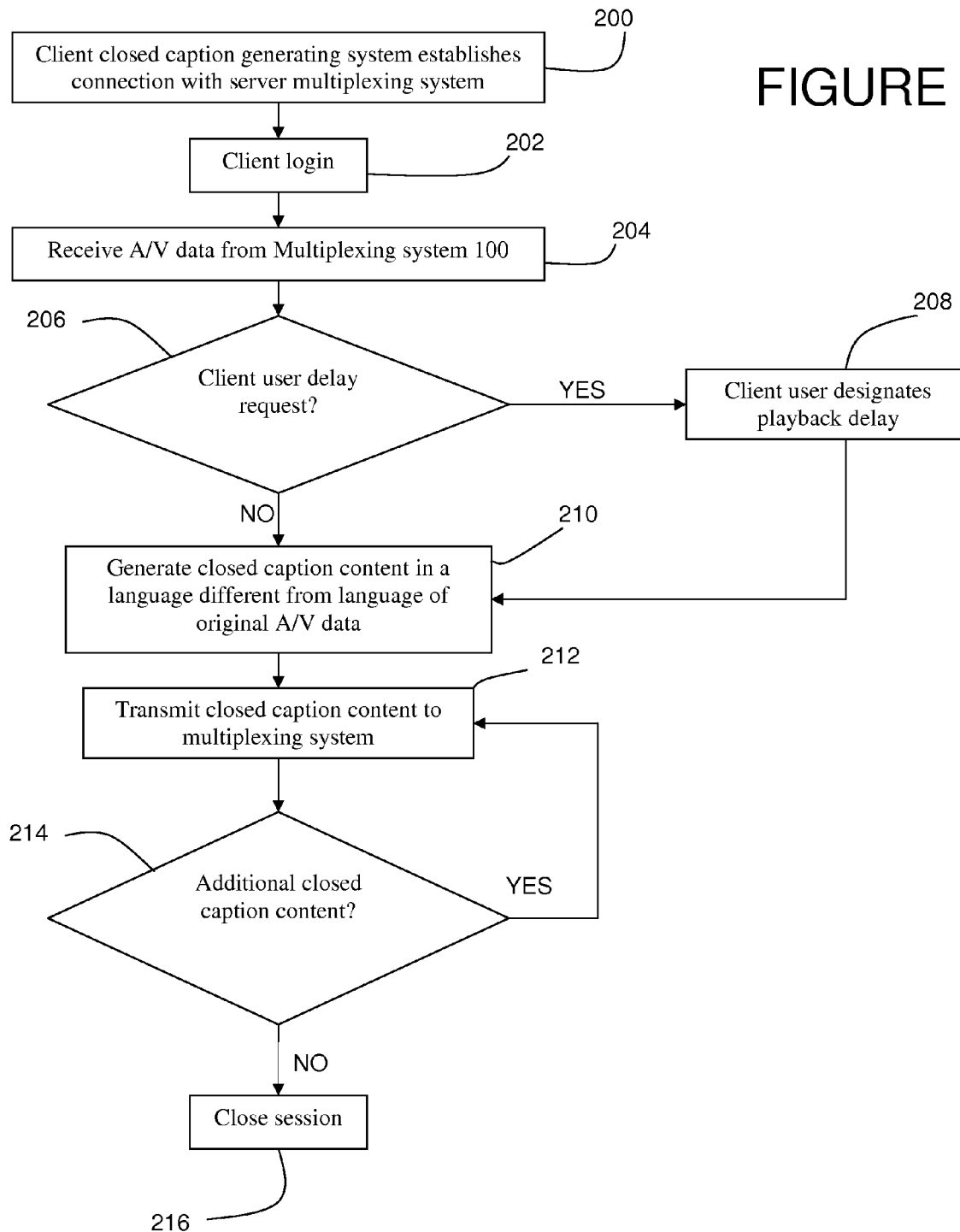
FIG. 2 is a flow diagram of a first aspect of a method of operating the system of FIG. 1.

FIG. 2 is an illustration of a first aspect of a method for blending multiple closed caption streams comprising different translations of a single program (i.e., a live or pre-recorded television program or other media to be encoded with closed captioning) into a single output for transmission to an end user according to an embodiment of the invention, particularly from the perspective of a client closed caption generating system 110. First, at step 200, a client closed caption generating system 110 establishes a connection with server multiplexing system 100, and at step 202 logs into the multiplexing system 100. Such login process preferably includes transmitting information identifying the particular client closed caption generating system 110 to the multiplexing system 100, which in turn informs multiplexing system 100 of the type of closed caption content that it should expect to receive from the client closed caption generating system 110. While for simplicity of description, only a single client closed caption generating system 110 is described with regard to the method depicted in FIG. 2, as described above, multiple client closed caption generating systems 110 will in fact be logged into multiplexing system 100 at one time, with each respective closed caption generating system 110 identifying itself to multiplexing system 100 through such login process.

After logging in, client closed caption generating system 110 receives A/V data from multiplexing system 100, which A/V data may originate, for example, from prerecorded A/V database 150 or from live broadcast transmission 151. In either case, such A/V data may be received by client closed caption generating system 110 in its original form, or it may be diverted to a human or machine translator 152 prior to multiplexing system 100 transmitting it to client closed caption generating system 110. In the event that such translator 152 is used prior to transmission, or if otherwise desirable to the user of client closed caption generating system 110, the user may at step 206 elect to delay one or more of the data streams (i.e., audio, video, metadata, or other) received from multiplexing system 110, and at step 208 designate the amount of delay they wish to use (e.g., to synchronize the video and the translated audio from translator 152).

Next, at step 210, the user of client closed caption generating system 110 may generate closed caption content, for instance using a stenographer device 111 or other input mechanism communicating with closed caption generating system 110, in the user's native language (and particularly in a language different from the original language of the A/V content). After such closed caption content is generated (and preferably on a rolling basis as the closed caption content is generated), at step 212 the client closed caption generating device transmits such content to multiplexing system 100. Last, at step 214, if additional closed caption content is generated by the user of closed caption generating system 110, such additional closed caption content continues to be transmitted to multiplexing system 100, and if not, the client closed caption generating system's session with the multiplexing system 100 is closed at step 216.

Figure 3:
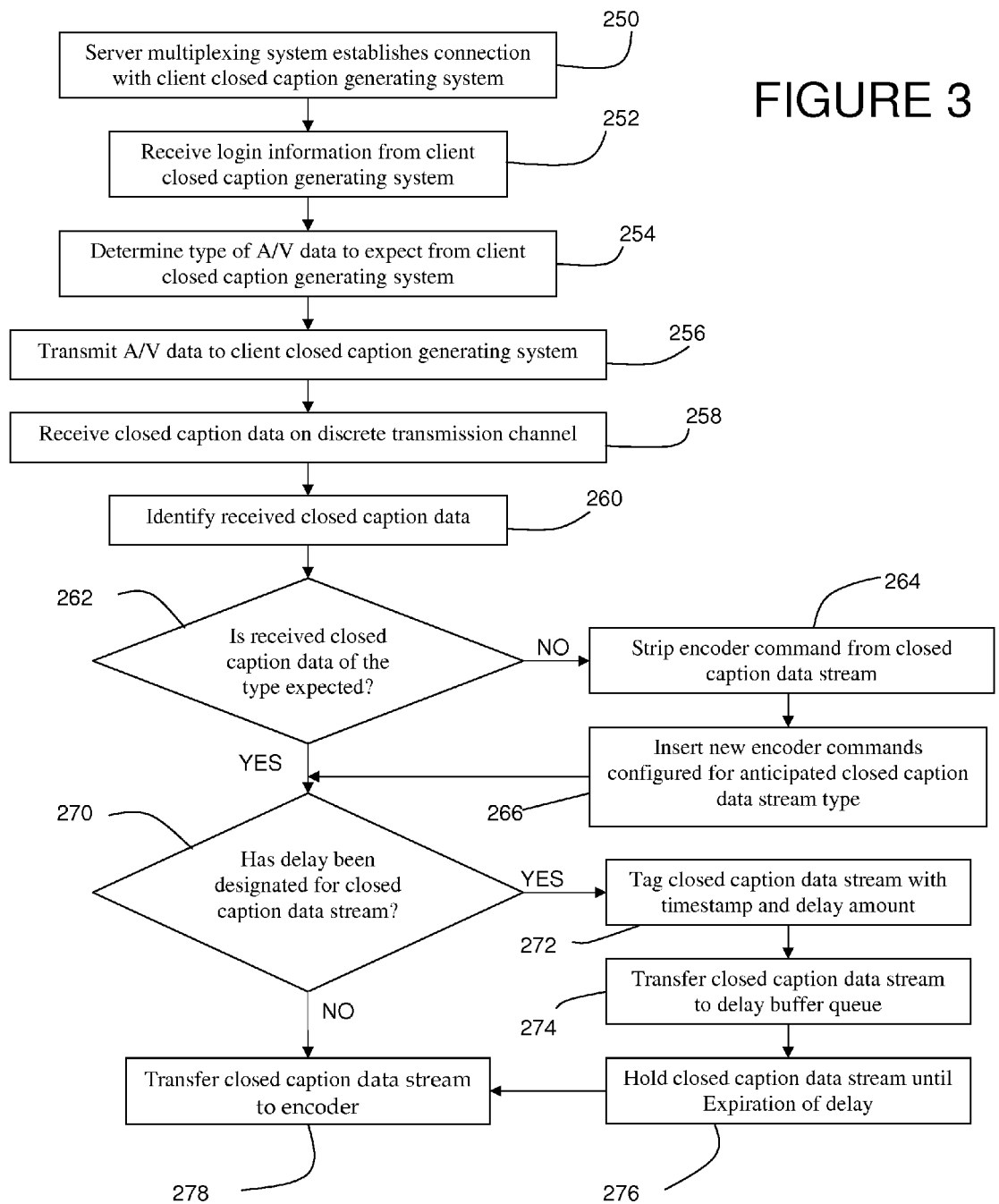
FIG. 3 is a flow diagram of a second aspect of a method of operating the system of FIG. 1.

Similarly, FIG. 3 is an illustration of another aspect of a method for blending multiple closed caption streams comprising different translations of a single program (i.e., a live or pre-recorded television program or other media to be encoded with closed captioning) into a single output for transmission to an end user according to an embodiment of the invention, particularly from the perspective of a multiplexing system 100. First, at step 250, server multiplexing system 100 establishes a connection with a client closed caption generating system 110, and at step 252, receives login information from such client closed caption generating system 110. Such login process preferably includes receiving information identifying the particular client closed caption generating system 110 to the multiplexing system 100, which in turn allows multiplexing system 100 to determine at step 254 the type of closed caption content that it should expect to receive from the client closed caption generating system 110. Once again, while for simplicity of description, only a single client closed caption generating system 110 is described with regard to the method depicted in FIG. 3, multiple client closed caption generating systems 110 will in fact be logged into multiplexing system 100 at one time, with each respective closed caption generating system 110 identifying itself to multiplexing system 100 through such login process. In each case, multiplexing system 100 may consult administrative database 155 to determine the associated type of closed caption data that it should receive from each respective closed caption generating system 110. Alternatively, and as described above, if such information is not yet stored in administrative database 155, a user of closed caption generating system 110 may choose the type of closed caption data it will transmit during such login process. If, however, a designation of a type of closed caption data is not received from a closed caption generating system 110 and none is previously stored in administrative database 155, then multiplexing system 110 defaults to CC1 for the duration of the session.

After receiving the login information from a client closed caption generating system 110, at step 256 multiplexing system 100 transmits A/V data to closed caption generating system 110, which A/V data may originate, for example, from prerecorded A/V database 150 or from live broadcast transmission 151. In either case, such A/V data may be received by client closed caption generating system 110 in its original form, or it may be diverted to a human or machine translator 152 prior to multiplexing system 100 transmitting it to client closed caption generating system 110. In the event that such translator 152 is used prior to transmission, or if otherwise desirable to the user of client closed caption generating system 110, the stenographer user may elect to delay one or more of the data streams (i.e., audio, video, metadata, or other) received from multiplexing system 110, and designate the amount of delay they wish to use (e.g., to synchronize the video and the translated audio from translator 152).

Again, it should be noted that while step 256 particularly references in FIG. 3 transmission of A/V data to a single client closed caption generating system 110, in a typical configuration multiplexing system 100 will transmit such A/V data to multiple client closed caption generating systems 110 such that multiple translations of the A/V content may be generated.

Next, at step 258, multiplexing system 100 receives back from client closed caption generating system 110 closed caption data on a discrete transmission channel, and at step 260 identifies that incoming closed caption stream. More particularly, multiplexing system 100 looks up in administrative database 155 the anticipated data stream type for the data stream received from closed caption generating system 110, and at step 262 determines by comparison whether the received closed caption data stream type is of the type that was anticipated. If the received closed caption data stream type is of the type that was anticipated, processing continues to step 270 as discussed below to determine whether a delay has been designated for the particular closed caption data stream. If not, then at step 264, multiplexing system 100 strips the original encoder commands from the received closed caption data signal, and inserts new encoder commands from encoding command writer 103 at step 266, which newly inserted encoder commands are configured for the anticipated closed caption data stream type.

Next, at step 270, multiplexing system 100 determines whether a delay has been designated for the particular closed caption data stream. If no delay has been previously designated by administrative client 160, then at step 278 the closed caption data stream is transferred to an encoder 500. If, however, a delay has previously been designated by administrative client 160 (e.g., in order to ensure synchronization of multiple closed caption data streams that are to be combined in a single output signal for transmission), then at step 272 multiplexing system 100 causes timestamp generator 105 to generate a timestamp for the received closed caption data stream and tags that closed caption data stream with the timestamp and the delay amount that was previously designated by administrative client 160. Then, at step 274, the closed caption data stream is transferred to delay buffer queue 104, and at step 276 the closed caption data stream is held in delay buffer queue 104 until expiration of the delay. Once the delay has expired, at step 278 the closed caption data stream is transferred to the designated encoder 500, where it is combined with one or more other closed caption data streams comprising different language translations of the same transmission, such that a single, multi-lingual closed caption encoded video signal may be encoded and ultimately transmitted to an end user.

Figure 4:
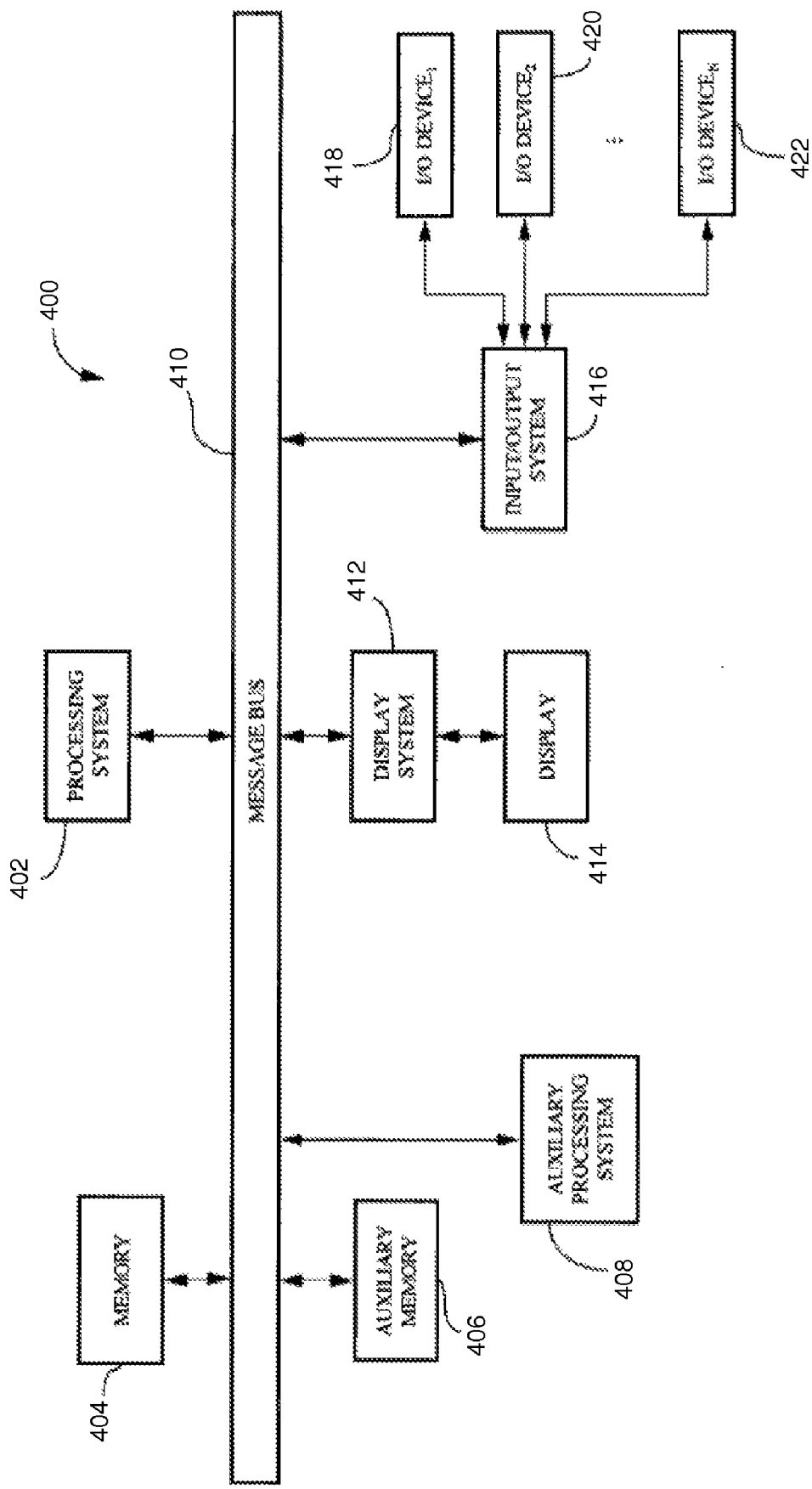
FIG. 4 is a schematic view of a computer hardware system suitable for use in implementing the closed caption processing system of FIG. 1.

As noted briefly above, multiplexing system 100 may be hosted on a server computer configured to communicate with client devices hosting closed caption generating systems 110 in a client/server application relationship communicating with one another using TCP/IP packets. An exemplary hardware system generally representative of a computing device suitable for use as such server and client devices is shown in FIG. 4. In each case, a central processing system 402 controls the hardware system 400 for each of the server hosting multiplexing system 100 and the clients hosting closed caption data generating systems 110, as well as administrative client 160. A central processing unit such as a microprocessor or microcontroller for executing programs is included in the central processing system 402 for the performance of data manipulations and controlling the tasks of the hardware system 400. A system bus 410 provides the communication with the central processor 402 for transferring information among the components of the hardware system 400. Facilitating information transfer between storage and other peripheral components of the hardware system may be a data channel that may be included in bus 410. Further, the set of signals required for communication with the central processing system 402 including a data bus, address bus, and control bus is provided by bus 410. It is contemplated that any state of the art bus architecture according to promulgated standards may be utilized for bus 410, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

A main memory 404 and auxiliary memory 406 (including an auxiliary processing system 408, as required) may be provided. The storage of instructions and data for programs executing on the central processing system 402 is provided by main memory 404. Typically semiconductor-based memory such as dynamic random access memory (DRAM) and/or static random access memory (SRAM) is used for the main memory 404. However, main memory 404 may utilize other semi-conductor-based memory types, such as synchronous dynamic random access memory (SDRAM), Rambus dynamic random access memory (RDRAM), ferroelectric random access memory (FRAM), and so on. The storage of instructions and data that are loaded into the main memory 404 before execution is provided by auxiliary memory 406. The storage capabilities provided by the auxiliary memory 406 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). Alternatively, a variety of non-semiconductor-based memories, including but not limited to floppy disk, hard disk, magnetic tape, drum, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and other varieties of memory devices as contemplated may be used for auxiliary memory 406.

Auxiliary processors of the auxiliary processing system 408, which are discrete or built into the main processor, may be included in hardware system 400. These auxiliary processors may be used as a digital signal processor (a special-purpose microprocessor having an architecture suitable for fast execution of signal processing algorithms), as a back-end processor (a slave processor subordinate to the main processing system), as an additional microprocessor or controller for dual or multiple processor systems, or as a coprocessor. They may also be used to manage input/output and/or to perform floating point mathematical operations.

A display system 412 for connecting to a display device 414, wherein the display system 412 may comprise a video display adapter having all of the components for driving the display device, including video memory, buffer, and graphics engine as desired, is included in hardware system 400. Video memory may be, for example, windows random access memory (WRAM), video random access memory (VRAM), synchronous graphics random access memory (SGRAM), and the like. The display device 414 may comprise a cathode ray-tube (CRT) type display such as a monitor or television, or an alternative type of display technology such as a projection-type CRT display, a light-emitting diode (LED) display, a gas or plasma display, an electroluminescent display, a vacuum fluorescent display, a cathodoluminescent (field emission) display, a liquid-crystal display (LCD) overhead projector display, an LCD display, a plasma-addressed liquid crystal (PALC) display, a high gain emissive display (HGED), and so forth.

An input/output (I/O) system 416 for connecting to one or more I/O devices 418, 420, and up to N number of I/O devices 422 is included in hardware system 400. Interface functions between the one or more I/O devices 418-422 may be provided by various controllers or adapters. I/O devices such as a keyboard, mouse, trackball, touchpad, joystick, trackstick, infrared transducers, printer, modem, RF modem, bar code reader, charge-coupled device (CCD) reader, scanner, compact disc read-only memory (CD-ROM), digital versatile disc (DVD), video capture device, touch screen, stylus, electroacoustic transducer, microphone, speaker, and others may be communicatively coupled by various interface mechanisms, such as universal serial bus (USB) port, universal asynchronous receiver-transmitter (UART) port, serial port, IEEE 1394 serial bus port, infrared port, network adapter, parallel port, printer adapter, radio-frequency (RF) communications adapter, and others. Analog or digital communication capabilities between the hardware system 400 and the input/output system 416 and I/O devices 418-422 may be provided for communication with external devices, networks, or information sources. Preferably industry promulgated architecture standards are implemented by system 416 and I/O devices 418-422, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It is to be understood that modification or reconfiguration of the hardware system 400 of FIG. 4 by one having ordinary skill in the art would not depart from the scope or the spirit of the present invention.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

We claim:

1. A computer implemented method for combining multi-lingual closed caption data streams into a single output signal for transmission to an end user, comprising the steps of:
   receiving at a multiplexing system computer a broadcast signal comprising audio visual data;
   simultaneously transmitting data signals from said multiplexing system computer to a plurality of closed caption translation data generating systems;
   receiving at said multiplexing system computer closed caption translation data streams from each of said closed caption translation data generating systems, wherein said closed caption translation data streams each comprises a translation of data in said audio visual data into a language that is different from an original language of said audio visual data, and wherein each of said closed caption translation data streams is generated by its respective closed caption translation data generating system independent of all other of said closed caption translation data generating systems; and
   transferring said closed caption translation data streams to a closed caption data encoder for encoding said closed caption data streams into a single, multiple translation closed caption data output signal that forms a part of a composite audio visual stream for television broadcast transmission to all end user receivers of said television broadcast transmission.

2. The computer implemented method of claim 1, further comprising the steps of:
   determining whether a transmission delay has been designated for each of said closed caption translation data streams, wherein said transmission delay is configured to adjust for timing differences caused by translation of audio data in said data signals; and
   upon a determination that a transmission delay has been designated for a closed caption translation data stream, transferring said closed caption translation data stream having a designated delay to a delay buffer queue prior to transferring said closed caption translation data stream having a designated delay to a closed caption data encoder.

3. The computer implemented method of claim 1, further comprising the steps of:
   receiving a login request from a closed caption data generating system, wherein said login request includes an identification of said closed caption data generating system; and
   determining an expected closed caption data stream type that is expected to be received from said closed caption data generating system.

4. The computer implemented method of claim 3, further comprising the steps of:
   determining a closed caption data stream type of each of said closed caption translation data streams;
   comparing each determined closed caption data stream type to said expected closed caption data stream type;
   identifying a closed caption translation data stream having a closed caption data stream type that does not match the expected closed caption data stream type;
   stripping encoder commands from said closed caption translation data stream having a closed caption data stream type that does not match the expected closed caption data stream type; and inserting new encoder commands into said closed caption translation data stream having a closed caption data stream type that does not match the expected closed caption data stream type, which new encoder commands are configured for said expected closed caption data stream type.

5. A system for combining multi-lingual closed caption data streams into a single output signal for transmission to an end user, comprising:
a multiplexing computer having executable computer code stored thereon adapted to:
receive a broadcast signal comprising audio visual data;
simultaneously transmit data signals to a plurality of closed caption translation data generating systems;
receive closed caption translation data streams from each of said closed caption translation data generating systems, wherein said closed caption translation data streams each comprises a translation of data in said audio visual data into a language that is different from an original language of said audio visual data, and wherein each of said closed caption translation data streams is generated by its respective closed caption translation data generating system independent of all other of said closed caption translation data generating systems; and
transfer said closed caption translation data streams to a closed caption data encoder for encoding of said closed caption data streams into a single, multiple translation closed caption data output signal that forms a part of a composite audio visual stream for television broadcast transmission to all end user receivers of said television broadcast transmission.

6. The system of claim 5, said executable computer code being further adapted to:
determine whether a transmission delay has been designated for any of said closed caption translation data streams; and
upon a determination that a transmission delay has been designated for a closed caption translation data stream, transfer said closed caption translation data stream having a designated delay to a delay buffer queue prior to transferring said closed caption translation data stream having a designated delay to a closed caption data encoder.

7. The system of claim 5, said executable computer code being further adapted to:
receive a login request from a closed caption data generating system, wherein said login request includes an identification of said closed caption data generating system; and
determine an expected closed caption data stream type that is expected to be received from said closed caption data generating system.

8. The system of claim 7, said executable computer code being further adapted to:
determine a closed caption data stream type of each of said closed caption translation data streams;
compare each determined closed caption data stream type to said expected closed caption data stream type;
identify a closed caption translation data stream having a closed caption data stream type that does not match the expected closed caption data stream type;
strip encoder commands from said closed caption translation data stream having a closed caption data stream type that does not match the expected closed caption data stream type; and
insert new encoder commands into said closed caption translation data stream having a closed caption data stream type that does not match the expected closed caption data stream type, which new encoder commands are configured for said expected closed caption data stream type.

9. A computer implemented method for combining multi-lingual closed caption data streams into a single output signal for transmission to an end user, comprising the steps of:
receiving audio visual data from a multiplexing system configured to transmit said audio visual data to a plurality of closed caption data generating systems;
generating a closed caption translation data stream comprising closed caption data in a language different from an original language of said audio visual data; and
transmitting said closed caption translation data stream to said multiplexing system, wherein said multiplexing system is further configured to combine said closed caption translation data stream with at least one third party independently generated closed caption translation data stream into a single, multiple translation closed caption data output signal that forms a part of a composite audio visual stream for television broadcast transmission to all end user receivers of said television broadcast transmission.

10. The computer implemented method of claim 9, wherein said audio visual data is received in said original language, further comprising the step of:
receiving an instruction to delay playback of said audio visual data; and
in response to said instruction, delaying at least a portion of a playback of said audio visual data.

11. The computer implemented method of claim 9, wherein audio data in said audio visual data is translated into a language different from said original language prior to receiving said audio visual data.

12. A system for combining multi-lingual closed caption data streams into a single output signal for transmission to an end user, comprising:
a closed caption generating system having executable computer code stored thereon adapted to:
receive audio visual data from a multiplexing system configured to transmit said audio visual data to a plurality of closed caption data generating systems;
generate a closed caption translation data stream comprising closed caption data in a language different from an original language of said audio visual data; and
transmit said closed caption translation data stream to said multiplexing system, wherein said multiplexing system is further configured to combine said closed caption translation data stream with at least one third party independently generated closed caption translation data stream into a single, multiple translation closed caption data output signal that forms a part of a composite audio visual stream for television broadcast transmission to all end user receivers of said television broadcast transmission.

13. The system of claim 12, wherein said audio visual data is received in said original language, and wherein said computer code is further adapted to:
receive an instruction to delay playback of said audio visual data; and
in response to said instruction, delay at least a portion of a playback of said audio visual data.

14. The system of claim 12, wherein audio data in said audio visual data is translated into a language different from said original language prior to receiving said audio visual data.

15. A computer implemented method for combining multi-lingual closed caption data streams into a single output signal for transmission to an end user, comprising the steps of:
- receiving at a multiplexing system computer a login request from a plurality of closed caption generating systems, wherein each said login request includes an identification of said closed caption data generating system;
- determining at said multiplexing system computer an expected closed caption data stream type that is expected to be received from each said closed caption data generating system;
- simultaneously transmitting data signals from said multiplexing system computer to said plurality of closed caption data generating systems;
- receiving at said multiplexing computer closed caption data streams from each of said closed caption data generating systems, wherein at least one of said closed caption data streams comprises a translation of data in said audio visual data into a language that is different from an original language of said audio visual data;
- identifying a closed caption data stream having a closed caption data stream type that does not match the expected closed caption data stream type;
- stripping encoder commands from said closed caption data stream having a closed caption data stream type that does not match the expected closed caption data stream stype;
- inserting new encoder commands into said closed caption data stream having a closed caption data stream type that does not match the expected closed caption data stream type, which new encoder commands are configured for said expected closed caption data stream type; and
- transferring said closed caption data streams to a closed caption data encoder for encoding of said closed caption data streams into a single, multi-lingual closed caption data output signal for transmission to an end user.

16. The computer implemented method of claim 15, further comprising the steps of:
- determining whether a transmission delay has been designated for any of said closed caption data streams; and
- upon a determination that a transmission delay has been designated for a closed caption data stream, transferring said closed caption data stream having a designated delay to a delay buffer queue prior to transferring said closed caption data stream having a designated delay to a closed caption data encoder.

17. A system for combining multi-lingual closed caption data streams into a single output signal for transmission to an end user, comprising:
- a multiplexing computer having executable computer code stored thereon adapted to:
  - receive a login request from a plurality of closed caption data generating systems, wherein each said login request includes an identification of said closed caption data generating system;
  - determine an expected closed caption data stream type that is expected to be received from each said closed caption data generating system;
  - simultaneously transmit audio visual data to a plurality of closed caption data generating systems;
  - receive closed caption data streams from each of said closed caption data generating systems, wherein at least one of said closed caption data streams comprises a translation of data in said audio visual data into a language that is different from an original language of said audio visual data;
  - identify a closed caption data stream having a closed caption data stream type that does not match the expected closed caption data stream type;
  - strip encoder commands from said closed caption data stream having a closed caption data stream type that does not match the expected closed caption data stream type; and
  - insert new encoder commands into said closed caption data stream having a closed caption data stream type that does not match the expected closed caption data stream type, which new encoder commands are configured for said expected closed caption data stream type; and
  - transfer said closed caption data streams to a closed caption data encoder for encoding of said closed caption data streams into a single, multi-lingual closed caption data output signal for transmission to an end user.

18. The system of claim 17, said executable computer code being further adapted to:
- determine whether a transmission delay has been designated for any of said closed caption data streams; and
- upon a determination that a transmission delay has been designated for a closed caption data stream, transfer said closed caption data stream having a designated delay to a delay buffer queue prior to transferring said closed caption data stream having a designated delay to a closed caption data encoder.

* * * * *